(12) United States Patent
Palmer et al.

(10) Patent No.: US 6,599,863 B1
(45) Date of Patent: Jul. 29, 2003

(54) FRACTURING PROCESS AND COMPOSITION

(75) Inventors: Bentley J. Palmer, Stafford, TX (US); Jesse Lee, Sugar Land, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 0 days.

(21) Appl. No.: 09/378,341

(22) Filed: Aug. 20, 1999

Related U.S. Application Data

(60) Provisional application No. 60/120,616, filed on Feb. 18, 1999.

(51) Int. Cl.$^7$ ............................................. E21B 43/26
(52) U.S. Cl. ................. 507/219; 507/921; 507/922; 507/209; 507/211; 507/221; 507/224; 507/225; 507/230; 166/308
(58) Field of Search .................... 166/308; 507/921, 507/922, 219, 209, 211, 221, 224, 225, 230

(56) References Cited

U.S. PATENT DOCUMENTS

| | | | |
|---|---|---|---|
| 2,855,365 A | 10/1958 | Burleson | |
| 4,526,695 A | * 7/1985 | Erbstoesser et al. | 166/295 |
| 4,629,575 A | * 12/1986 | Weibel | 507/214 |
| 4,631,136 A | 12/1986 | Jones, III | |
| 4,716,964 A | * 1/1988 | Erbstoesser et al. | 166/308 |
| 4,843,118 A | 6/1989 | Lai et al. | |
| 4,941,537 A | * 7/1990 | Langemeier et al. | 166/308 |
| 4,961,466 A | * 10/1990 | Himes et al. | 166/308 |
| 5,009,797 A | * 4/1991 | Penny et al. | 507/921 |
| 5,103,905 A | 4/1992 | Brannon et al. | 166/300 |
| 5,350,528 A | * 9/1994 | Westland | 166/308 |
| 5,439,055 A | * 8/1995 | Card et al. | 166/295 |
| 5,486,591 A | 1/1996 | Domb et al. | |
| 5,501,275 A | 3/1996 | Card et al. | 166/280 |
| 5,604,184 A | 2/1997 | Ellis et al. | |
| 5,624,886 A | * 4/1997 | Dawson et al. | 507/921 |
| 5,775,425 A | 7/1998 | Weaver et al. | 166/276 |
| RE36,066 E | 1/1999 | Mueller et al. | |
| 6,098,712 A | * 8/2000 | Burts, Jr. | 166/295 |

FOREIGN PATENT DOCUMENTS

| | | |
|---|---|---|
| GB | 2265646 A | 10/1993 |
| SU | 1781280 A1 | 11/1989 |

* cited by examiner

*Primary Examiner*—Philip Tucker
(74) *Attorney, Agent, or Firm*—Doug Y'barbo; Catherine Menes; Brigitte Jeffery

(57) ABSTRACT

The invention provides a method of fracturing, including the provision and use of a fracturing fluid suspension containing an effective amount of a solid particulate breaker material having delayed breaking or degradation characteristics, additionally including an amount of durable fibers and/or platelets sufficient to enhance wellbore solids, such as proppant, transport. In a preferred aspect, solid particulate matter, which comprises or is composed of a specified organic polymeric compound or composition having an average molecular weight of at least 10,000, or a mixture of such compounds or compositions, and which solid organic polymeric matter reacts or decomposes, as described, is combined in a fracturing fluid with or containing a specified gellant and proppant, to form a fracturing fluid suspension, and the suspension formed is pumped downwell and deposited as a gelled suspension in the subterranean formation, generally under fracturing conditions.

29 Claims, 2 Drawing Sheets

Viscosity as a Function of 1.5 D Dacron Conc. At 275 °F

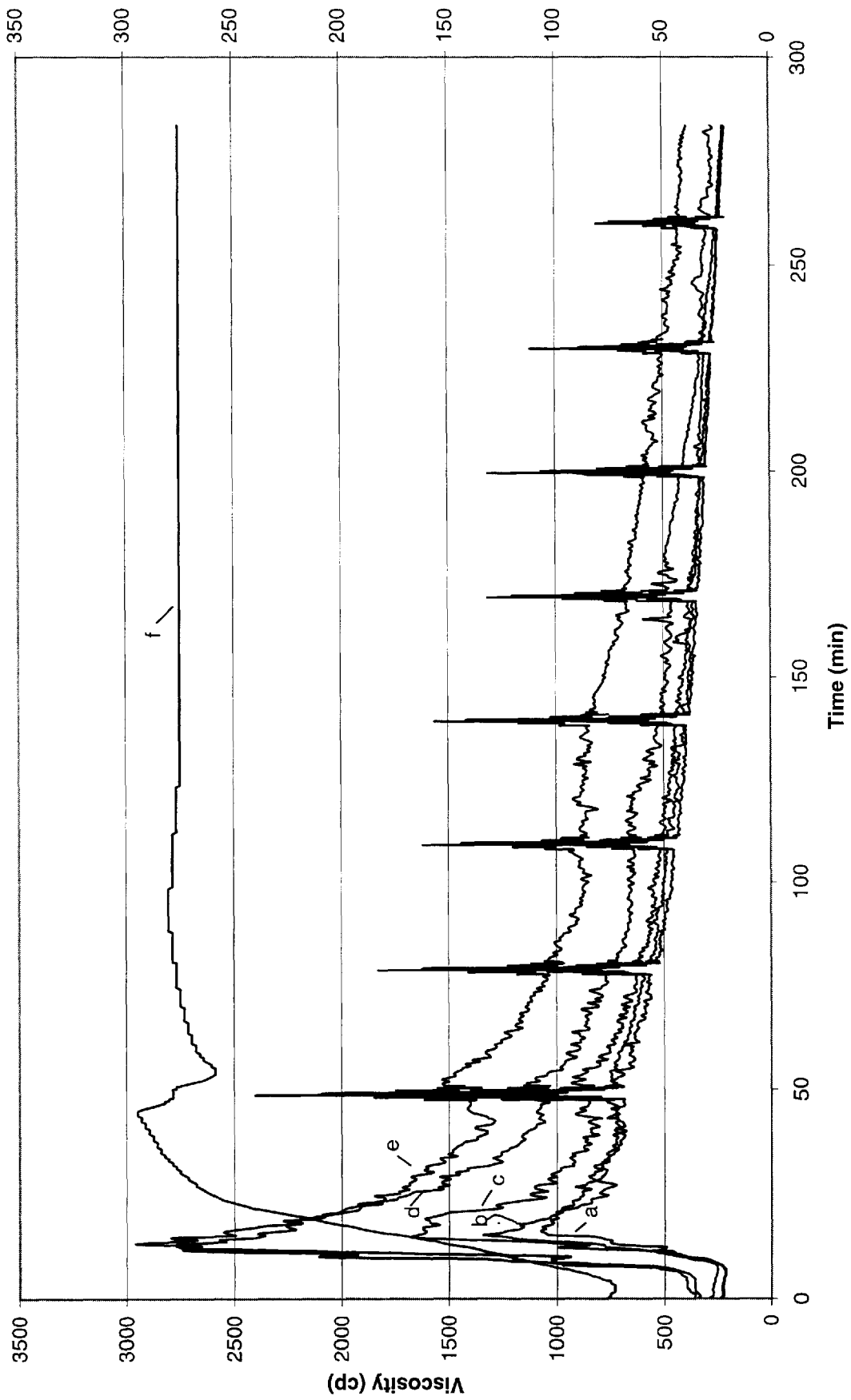
Figure 1: Viscosity as a Function of 1.5 D Dacron Conc. At 275 °F

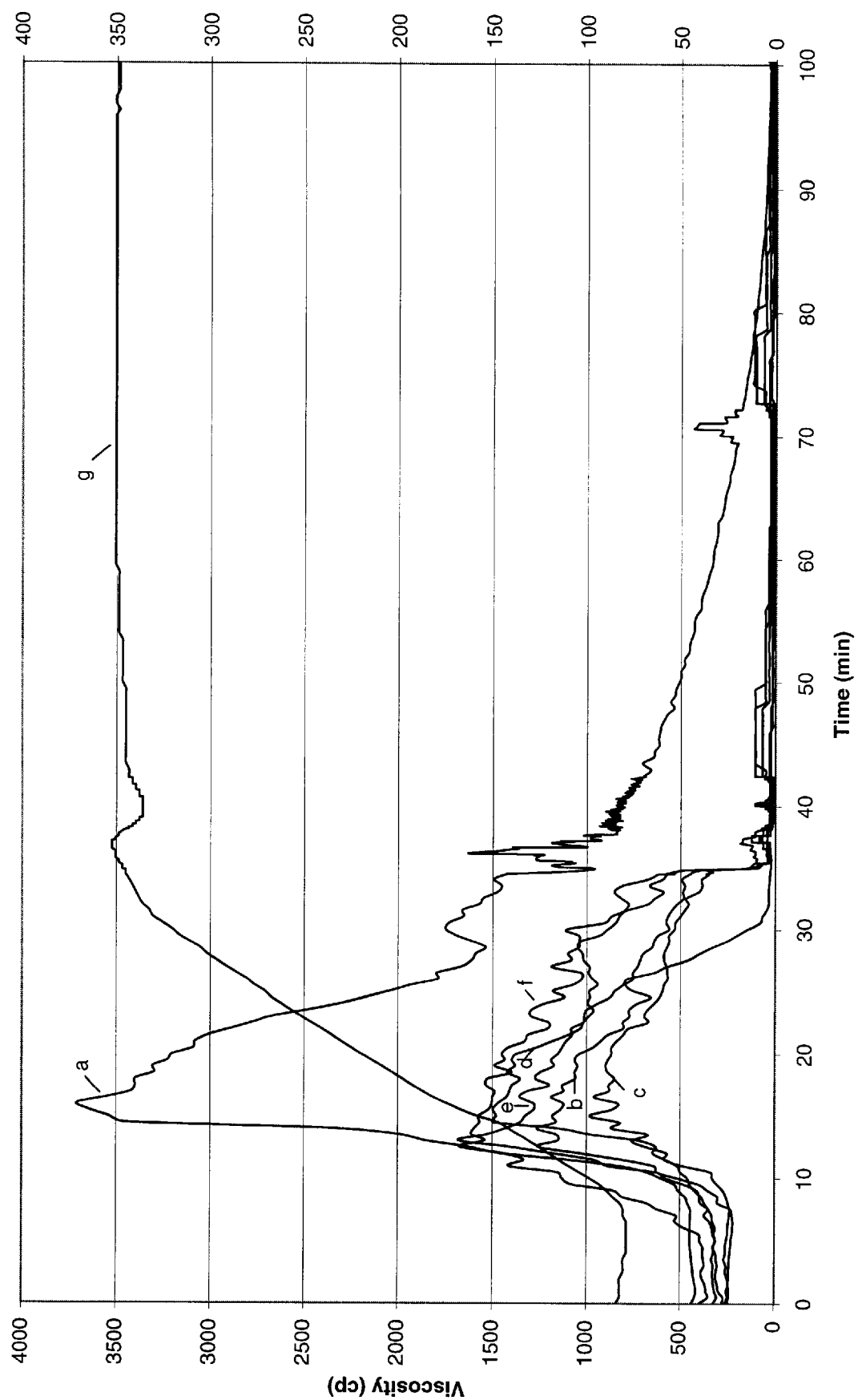

FRACTURING PROCESS AND COMPOSITION

REFERENCE OF RELATED APPLICATIONS

This application claims the benefit of U.S. Provisional Application Ser. No. 60/120616, filed Feb. 18, 1999.

FIELD OF THE INVENTION

The invention relates to the fracturing of subterranean formations, particularly in hydrocarbon well development or in hydrocarbon well renewal.

BACKGROUND OF THE INVENTION

In the recovery of hydrocarbon values from subterranean formations, it is common practice, particularly in formations possessing low permeability, to fracture the hydrocarbon-bearing formation to provide flow channels to facilitate production of the hydrocarbons to the wellbore. In such fracturing operations, a fluid (fracturing fluid) is hydraulically injected down a well penetrating the subterranean formation and is forced against the formation by pressure. By this procedure, the formation is forced to crack or fracture, and proppant, generally solid particles designed to prop open the fracture when the fracturing pressure is released, is placed in the fracture. If the fracturing operation is successful, the crack or fracture developed provides improved flow of the recoverable fluid, e.g., oil or gas, into the well.

U.S. Pat. No. 5,439,055; U.S. Pat. No. 5,330,005; and U.S. Pat. No. 5,501,275 disclose procedures and compositions for treating subterranean formations to achieve improved recovery. The inventions of these patents are characterized by the use or presence of particulate materials and various solid materials, with emphasis on the formation of matrices of solid material and particulate material, or "packs", in the formation. Included among the wide variety of solid materials disclosed which may be employed in forming a pack or matrix are various types of fibrous materials, such as fibers of glass, ceramic, carbon, natural or synthetic polymers, or metal filaments. Important aspects of the procedures employed are the formation of stabilized matrices and prevention of proppant flowback from the subterranean formations.

While a wide variety of fluids may be used for fracturing, depending on the circumstances of the operation, a typical fracturing fluid, including the initial or "pad" fluid (no proppant) employed, preferably comprises or is composed of a thickened or gelled aqueous solution. Upon or after initiation of the fracture by the pad, the gelled or thickened fluid commonly utilized in the fracture extending step has suspended therein the proppant particles, the latter being substantially insoluble in the fluids of the formation. Suitable proppant materials include, but are not limited to, sand, walnut shells, sintered bauxite, or similar materials. A fuller description of fracturing procedure is found in U.S. Pat. No. 4,470,915 to Conway.

In order to achieve these steps, the fluid selected for fracturing commonly comprises a liquid whose viscosity is sufficient to transport proppant downwell in suspension, and which may be gelled or formulated to thicken or gel for assisting opening or extension of the fracture and deposit of the proppant in the fracture. In one known procedure, for example, the proppant carrying fluid, which contains a gelling agent or gellant and a crosslinking agent to crosslink the gellant, also contains a retarding agent which delays the crosslinking action of the crosslinking agent upon the gellant until the fracturing operation is imminent or is commenced. However, as is well understood by those skilled in the art, upon completion of the fracturing operation, to insure recovery of the desired hydrocarbons, it is necessary to remove or "break" the gel in the fracture created so that flow of the hydrocarbons through the fracture and proppant pack and into the wellbore is accomplished. To this end, a variety of "breaker" compositions and "breaking" procedures have been developed.

In particular, breakers which have been employed include various enzymes. (U.S. Pat. No. 5,067,566), and carboxylic acid esters (U.S. Pat. No. 5,223,159). U.S. Pat. No. 4,848,467 discloses the use of hydroxyacetic acid condensation product in a fracturing procedure which employs a hydrolyzable aqueous gel. According to the last mentioned patent, the hydroxyacetic acid condensation product, a low molecular weight polymeric material, functions as a fluid loss additive and further degrades at formation conditions to provide hydroxyacetic acid which breaks the aqueous gel, restoring formation permeability without the need for separate addition of a gel breaker. The commercial utility of this procedure is not known.

Notwithstanding the developed state of breaker procedures, room for improvement has existed. For example, while "breaker" compositions are well known, such compositions, with the exception of the aforementioned composition of U.S. Pat. No. 4,848,467, generally perform little or no additional function in the fracture fluid suspension, and may be said to be simply along for the ride down the well. Accordingly, a novel breaker approach, which would provide additional benefits, at least in some embodiments, might have significant technical and commercial advantage. The invention provides such an approach.

SUMMARY OF THE INVENTION

Broadly, the invention relates to a novel and improved manner of breaking a fluid suspension gel. More particularly, the invention relates to an improved fracturing process or method, and novel fracturing composition or suspension, the invention being characterized by an improved breaker mechanism. In a particularly advantageous aspect, the invention provides a novel method of fracturing featuring improved matter transfer or mobility, e.g., improved downwell proppant and/or other solids transport, along with or combined with improved gel breaker means. In yet another embodiment, the invention provides a method of fracturing, including the provision and use of a fracturing fluid suspension containing an effective amount of a solid particulate breaker material having delayed breaking or degradation characteristics, additionally including an amount of durable fibers and/or platelets sufficient to enhance wellbore solids, such as proppant, transport.

Accordingly, in one aspect, solid particulate matter, which comprises or is composed of a specified organic polymeric compound or composition having an average molecular weight of at least 10,000, or a mixture of such compounds or compositions, and which solid organic polymeric matter reacts or decomposes, as described hereinafter, is provided in a fracturing fluid with or containing a specified gellant and proppant to form a fracturing fluid suspension, and the suspension formed is pumped downwell and deposited as a gelled suspension in the subterranean formation, generally under fracturing conditions. As used herein, the term "particulate matter" refers to small discrete particles, portions or fragments, in all possible shapes, including fibrous materials (fibers) and/or platelets, of the specified organic polymeric material(s), as described more fully hereinafter. Commonly, the solid organic polymeric particulate matter is provided in the suspension in at least an amount sufficient (or sufficient amount) to provide over time an amount or concentration of a composition or compositions effective to degrade or decompose the gelled suspension in the formation either completely or to the desired degree. In the usual case, an amount of organic polymeric particulate matter, as described hereinafter, is utilized which provides an amount of its reaction, or degradation or decomposition products, upon reaction with or decomposition of the organic polymeric particulate matter over time in the downwell environment, as also defined hereinafter, effective to degrade or decompose the gelled suspension, more than one mechanism for breaking the gelled suspension being possible. Accordingly, by allowing the organic polymeric material to react or decompose in the downwell environment or downwell conditions, the amount of the organic polymeric particulate matter reacted or decomposed is thus effectively "removed" from the fracture by its reaction or decomposition in the fracture, one or more ultimate products from such reaction or decomposition degrading or reacting with the gel or gelled suspension, or one or more of the gel's components, and thereby decomposing or breaking the gel. Alternatively, other breaker compositions may be present, in desired amounts, so that the breaking procedure of the invention may be adapted to fine control by the operator.

While the breaker mechanism discovery of the invention is suited to any conventional fracturing procedure, the invention is particularly adapted to fracturing procedures employing fibers and/or platelets for strengthening the proppant pack, particularly if the organic polymeric particulate matter employed is also in the form of fibers. Additionally, regardless of the proppant pack characteristics in the fracture, the invention is particularly advantageous in the fracturing of high temperature subterranean formations, e.g., subterranean formations having a temperature of from about 225° F. or higher. In particularly preferred embodiments, suitable adjustment of the breaker composition, including variation of or use of multiple particle sizes or organic polymeric material types, and/or pH control, allows improved and advantageous timing of the gel breaking operation.

In yet a further aspect, the invention comprises a novel fracturing fluid composition or suspension for carrying out the aforementioned procedures and features. Such compositions may also include components for pH adjustment for both gel formation and for aiding or retarding reaction or decomposition of the aforementioned organic polymeric particulate matter. Unless otherwise specified or evident from the context, all percentages given herein are by weight, based on the weight of the fluid. Other variations and aspects of the invention will be apparent from the further description herein and appended claims.

BRIEF DESCRIPTION OF THE DRAWING

FIG. 1 of the drawing illustrates the results of tests conducted on specified organic polymeric particulate matter, in this case one-fourth inch, 1.5 denier Dacron® (polyethylene terephthalate) fibers.

FIG. 2 illustrates the results of tests conducted using one-fourth inch, 6.0 denier Dacron® fibers.

DETAILED DESCRIPTION OF THE INVENTION

According to the invention, the solid organic polymeric particulate matter composition is selected for its ultimate and delayed reactivity and/or degradation characteristics in providing the required gel breaking action and cleanup, it being required, of course, that its reactivity or degradation in the fluid suspension be sufficiently gradual, delayed, or retarded (delayed) that formation of a gel by the suspension is not significantly inhibited or the gelled suspension broken before the fracturing operation is carried out to the desired extent. That is, the solid organic polymeric particulate matter should not react with other components of the fluid or the particles to be removed and/or transported or the formation components, or decompose or degrade in the fluid suspension, at a rate faster than desired. The suitability of a particular solid organic polymeric particulate material or composition(s) may be determined by testing, as illustrated hereinafter, and a composition or compositions may be prepared, for example, by blending, or may be chosen, which degrade or decompose at a rate corresponding to the time required for carrying out the fracturing operation, as determined by such testing. Accordingly, the solid organic polymeric particulate matter employed in the invention may be chosen from a wide variety of organic polymeric materials of the type mentioned, provided the particles possess such delayed reactivity and/or decomposition characteristics. Thus, natural and synthetic organic polymers or elastomers having an average molecular weight of at least 10,000, preferably at least 15,000 to 18,000, and most preferably at least 100,000, as determined by size exclusion chromatography or other suitable method, having the required reactivity and/or decomposition characteristics, may be employed. As utilized herein, the expressions "organic polymeric", as applied to "compound" and to "material", and "organic polymer" and "polymer", are understood to include not only polymerization products of a monomer, but copolymers, terpolymers, etc. Additionally, all types of mixtures of the mentioned materials may be employed. For example, suitable polymeric particulate matter derived from cellulose, acrylic acid, aramides, acrylonitrile, polyamides, vinylidene, olefins, diolefins, polyester, polyurethane, vinyl alcohol, and vinyl chloride, may be used. Preferred compositions, assuming the required reactivity and/or decomposition characteristics may be selected from rayon, acetate, triacetate, cotton, wool (cellulose group); nylon, acrylic, modacrylic, nitrile, polyester, saran, spandex, vinyon, olefin, vinyl, (synthetic polymer group); azlon, rubber (protein and rubber group), and mixtures thereof. Polyester and polyamide particles of sufficient molecular weight, such as from Dacron® and nylon, respectively, and mixtures thereof, are most preferred. Again, composite particles, comprising natural and/or synthetic materials of appropriate characteristics, may be employed. For example, a suitable composite particle might comprise a core and sheath structure where the sheath material and the core material degrade over different desired periods of time. The compounds or compositions employed as organic polymeric material according to the invention need not be pure, and commercially available materials containing various additives, fillers, etc. or having coatings may be used, so long as such components do not interfere with the required activity.

As indicated, the amount of the organic polymeric particulate matter supplied will be sufficient for the task required, i.e., a sufficient or effective amount, an amount sufficient to provide a sufficient concentration of a composition or compositions which are effective to degrade the gelled suspension to the desired degree. Normally, as also indicated, this composition or compositions will comprise one or more of the ultimate reaction or decomposition products of the organic polymeric material. Preferably, the organic polymeric particulate matter level, i.e., concentration, provided initially in the fluid may range from 0.02 percent up to about 10 percent by weight of the fluid. Most preferably, however, the concentration ranges from about 0.02 percent to about 5.0 percent by weight of fluid.

Particle size and shape, while important, may be varied considerably, depending on timing and transport considerations. Preferably, if irregular or spherical particles of the organic polymer are used, particle size may range from 80 mesh to 2.5 mesh (Tyler), preferably from 60 mesh to 3 mesh. Fibers and/or platelets of the specified polymeric materials are preferred for their mobility and transfer aiding capability. In the case of fibers of the organic polymer, the fibers employed according to the invention may also have a wide range of dimensions and properties. As employed herein, the term "fibers" refers to bodies or masses, such as filaments, of natural or synthetic material(s) having one dimension significantly longer than the other two, which are at least similar in size, and further includes mixtures of such materials having multiple sizes and types. Preferably, in accordance with the invention, individual fiber lengths may range upwardly from about 1 millimeter. Practical limitations of handling, mixing, and pumping equipment in wellbore applications, currently limit the practical use length of the fibers to about 100 millimeters. Accordingly, a preferred range of fiber length will be from about 1 mm to about 100 mm or so, with a most preferred length being from at least about 2 mm up to about 30 mm. Similarly, fiber diameters will preferably range upwardly from about 5 microns, a preferred range being from about 5 microns to about 40 microns, most preferably from about 8 microns to about 20 microns, depending on the modulus of the fiber, as described more fully hereinafter. A ratio of length to diameter (assuming the cross section of the fiber to be circular) in excess of 50 is preferred. However, the fibers may have a variety of shapes ranging from simple round or oval cross-sectional areas to more complex shapes such as trilobe, figure eight, star-shape, rectangular cross-sectional, or the like. Preferably, generally straight fibers with round or oval cross sections will be used. Curved, crimped, branched, spiral-shaped, hollow, fibrillated, and other three dimensional fiber geometries may be used. Again, the fibers may be hooked on one or both ends. Fiber and platelet densities are not critical, and will preferably range from below 1 to 4 g/cm$^3$ or more.

Those skilled in the art will recognize that a dividing line between what constitute "platelets", on one hand, and "fibers", on the other, tends to be arbitrary, with platelets being distinguished practically from fibers by having two dimensions of comparable size both of which are significantly larger than the third dimension, fibers, as indicated, generally having one dimension significantly larger than the other two, which are similar in size. As used herein, the terms "platelet" or "platelets" are employed in their ordinary sense, suggesting flatness or extension in two particular dimensions, rather than in one dimension, and also is understood to include mixtures of both differing types and sizes. In general, shavings, discs, wafers, films, and strips of the polymeric material(s) may be used. Conventionally, the term "aspect ratio" is understood to be the ratio of one dimension, especially a dimension of a surface, to another dimension. As used herein, the phrase is taken to indicate the ratio of the diameter of the surface area of the largest side of a segment of material, treating or assuming such segment surface area to be circular, to the thickness of the material (on average). Accordingly, the platelets utilized in the invention will possess an average aspect ratio of from about 10 to about 10,000, preferably 100 to 1000. Preferably, the platelets will be larger than 5 microns in the shortest dimension, the dimensions of a platelet which may be used in the invention being, for example, 6 mm.×2 mm.×15 µm.

In a particularly advantageous aspect of the invention, particle size of the organic polymeric particulate matter may be managed or adjusted to advance or retard the reaction or degradation of the gelled suspension in the fracture. Thus, for example, of the total particulate matter content, 20 percent may comprise larger particles, e.g., greater than 100 microns, and 80 percent smaller, say 80 percent smaller than 20 micron particles. Such blending in the gelled suspension may provide, because of surface area considerations, a different time of completion of reaction or decomposition of the particulate matter, and hence the time of completion of gel decomposition or breaking, when compared with that provided by a different particle size distribution.

The selection of the fluid or liquid to form the suspension with the solid organic polymeric particulate material and other components, such as gellant and proppant, is largely a matter of choice, within the capability of those skilled in the art, and per se forms no part of the present invention. As such persons will be aware, however, the fluid, particulate material, gel forming material, etc., must be sufficiently compatible to the extent that they do not react with one another at a rate which would deleteriously interfere to any significant extent with the intended functions specified herein. Commonly, the particular fluid chosen will be determined by such considerations as treating temperature, concentration of solid material to be carried, and the desired objective. In general, any suitable fluid or liquid which provides sufficient viscosity, perhaps in conjunction with solid fibrous materials therein, to transport the proppant and other components utilized to the fracturing area or fracture, does not unduly interfere with the effectiveness of the solid particulate matter of the invention, and which results in minimal damage to the pack and to the formation, may be used, it being understood that the term "fluid", includes mixtures of such materials. The fluid will preferably be aqueous, and may comprise a gas, i.e., a foam may be employed. Any common aqueous well treatment fluid may be employed, keeping the requirements previously mentioned in mind. Suitable fluids may also include aqueous solutions of viscoelastic surfactants, i.e., surfactants which are capable of providing viscosity without requiring the addition of polymers. Fluids comprising oil-in-water emulsions may be used, and, in the appropriate instance, hydrocarbon fluids, such as diesel, may be used. Particularly preferred are the type of fracturing fluids described by Nimerick, Crown, McConnell, and Ainley in U.S. Pat. No. 5,259,455, and those disclosed in U.S. Pat. No. 4,686,052. Proportions of the components of the fluid suspension are selected to insure that fluid character, i.e., flowability, and suspension of the organic polymeric particulate material and solid material, e.g., proppant, are maintained during pumping or down well transport, i.e., an amount of the well treatment fluid or liquid is provided or present sufficient to insure fluid flow for the suspensions. Generally, the composite fluids or fluid suspensions of the invention will comprise viscous liquids.

The solid particulate matter, e.g., fibers, or fibers and/or platelet, containing fluid suspensions used in the invention may be prepared in any suitable manner or in any sequence or order. Thus, the suspension may be provided by blending in any order at the surface, and by addition, in suitable proportions, of the components to the fluid or slurry during treatment on the fly. The suspensions may also be blended offsite. In the case of some materials, which are not readily dispersible, the fibers should be "wetted" with a suitable fluid, such as water or a wellbore fluid, before or during mixing with the fracturing fluid, to allow better feeding of the fibers. Good mixing techniques should be employed to avoid "clumping" of the particulate matter.

To the extent other breaker materials are employed, the total amount of the solid particulate matter of the invention may be reduced. It is possible; however, to provide a combination of solid particulate matter in the manner of the invention along with minor amounts, i.e., less than fifty percent, of other breaker materials, such combinations providing significant transport advantages if the solid particulate matter is in the form of fibers or platelets. As will be understood by those skilled in the art, in the case where fibers and/or platelets are employed to form a porous pack upon completion of the fracturing operation or procedure, e.g., as described in the procedures of the aforementioned U.S. Pat. No. 5,439,055.; U.S. Pat. No. 5,330,005; and U.S. Pat. No. 5,501,275, the total amount of fibers employed or pumped, assuming the use of suitable fibers as the solid organic polymeric particulate matter, will include that required for gel breaking and that for porous pack formation. As those skilled in the art will recognize, the fibers employed for pack strengthening will be chosen for durability rather than for the characteristics desired in the breaker materials selected herein, so that, in a given fracturing operation, both types of fibers may be utilized, each contributing a designed function and both contributing to or enhancing matter mobility or transport. Concentrations of "pack-forming" fibers and/or platelets in the fracturing fluid suspension for porous pack formation will be those described in the above listed patents, with even quite minor amounts of fibers and/or platelets being effective or sufficient to enhance transport.

Any suitable polymeric gel forming material or gellant, preferably water soluble, used by those skilled in the art to treat subterranean formations and form stable or stabilized gels of the fluid suspension may be employed in the invention. For simplicity hereinafter, included in the phrase "water soluble", as applied to the gellant, are those suitable polymeric materials which are dispersible or suspendable in water or aqueous liquid. Suitable gellants also include crosslinkable polymers or monomers for forming such polymers under the conditions extant. Such cross-linkable polymeric and polymer forming materials are well known, and the crosslinked polymer or polymers which produce the stable or stabilized gel are preferably formed by reacting or contacting appropriate proportions of the crosslinkable polymer with a crosslinking agent or agents. Similarly, procedures for preparing gelable compositions or fluids and conditions under which such compositions form stable gels in subterranean formations are well known to those skilled in the art. As indicated, gel-forming compositions according to the invention may be formed by mixing, in water, the water soluble crosslinkable polymer and the crosslinking agent.

In forming the gel, the crosslinkable polymer(s) and crosslinking agent and concentrations thereof are normally selected to assure (a) gel formation or presence at subterranean (i.e., formation or reservoir) conditions and (b) suitable time allotment for injection of the composition prior to the completion of gelation, or sufficient fluidity of the gelled composition to allow pumping down well. The polymer (or monomers used to form the polymer) and the crosslinking agent are generally selected and supplied in amounts effective to achieve these objectives. By "effective" amounts of the polymer or polymers (or monomers) and crosslinking agents is meant amounts sufficient to provide crosslinked polymers and form the desired stable gel under the conditions extant. Generally, a water soluble crosslinkable polymer concentration in the aqueous liquid of from about 0.05 to about 40 percent, preferably from about 0.1 percent to about 10 percent, and, most preferably, from about 0.2 percent to about 7 percent, may be employed (or sufficient monomer(s) to form these amounts of polymer). Typically, the crosslinking agent is employed in the aqueous liquid in a concentration of from about 0.001 percent to about 2 percent, preferably from about 0.005 percent to about 1.5 percent, and, most preferably, from about 0.01 percent to about 1.0 percent.

However, if a crosslinked polymer is to be used, the fluids of the invention need not contain both the crosslinkable polymer and the crosslinking agent at the surface. The crosslinkable polymer or the crosslinking agent may be omitted from the fluid sent downhole, the omitted material being introduced into the subterranean formation as a separate slug, either before, after, or simultaneously with the introduction of the fluid. In such cases, concentrations of the slugs will be adjusted to insure the required ratios of the components for proper gel formation at the desired location. Preferably, the surface formulated composition or fluid comprises at least the crosslinkable polymeric material (e.g., acrylamide, vinyl acetate, acrylic acid, vinyl alcohol, methacrylamide, ethylene oxide, or propylene oxide). More preferably, the composition comprises both (a) the crosslinking agent and (b) either (i) the crosslinkable polymer or (ii) the polymerizable monomers capable of forming a crosslinkable polymer. In treating a subterranean fracture, the formulations may be allowed to gel or begin gelation before entering the formation.

As indicated, mixtures of polymeric gel forming material or gellants may be used. Materials which may be used include water soluble crosslinkable polymers, copolymers, and terpolymers, such as polyvinyl polymers, polyacrylamides, cellulose ethers, polysaccharides, lignosulfonates, ammonium salts thereof, alkali metal salts thereof, alkaline earth salts of lignosulfonates, and mixtures thereof. Specific polymers are acrylic acid-acrylamide copolymers, acrylic acid-methacrylamide copolymers, polyacrylamides, partially hydrolyzed polyacrylamides, partially hydrolyzed polymethacrylamides, polyvinyl alcohol, polyvinyl acetate, polyalkyleneoxides, carboxycelluloses, carboxyalkylhydroxyethyl celluloses, hydroxyethylcellulose, galactomannans (e.g., guar gum), substituted galactomannans (e.g. hydroxypropyl guar), heteropolysaccharides obtained by the fermentation of starch-derived sugar (e.g., xanthan gum), ammonium and alkali metal salts thereof, and mixtures thereof. Preferred water soluble crosslinkable polymers include hydroxypropyl guar, carboxymethylhydroxypropyl guar, partially hydrolyzed polyacrylamides, xanthan gum, polyvinyl alcohol, the ammonium and alkali metal salts thereof, and mixtures thereof.

Similarly, the crosslinking agent(s) may be selected from those organic and inorganic compounds well known to those skilled in the art useful for such purpose, and the phrase "crosslinking agent", as used herein, includes mixtures of such compounds. Exemplary organic crosslinking agents include, but are not limited to, aldehydes, dialdehydes, phenols, substituted phenols, ethers, and mixtures thereof. Phenol, resorcinol, catechol, phloroglucinol, gallic acid, pyrogallol, 4,4'-diphenol, 1,3-dihydroxynaphthalene, 1,4- benzoquinone, hydroquinone, quinhydrone, tannin, phenyl acetate, phenyl benzoate, 1-naphthyl acetate, 2-naphthyl acetate, phenyl chloracetate, hydroxyphenylalkanols, formaldehyde, paraformaldehyde, acetaldehyde, propanaldehyde, butyraldehyde, isobutyraldehyde, valeraldehyde, heptaldehyde, decanal, glyoxal, glutaraldehyde, terephthaldehyde, hexamethylenetetramine, trioxane, tetraoxane, polyoxymethylene, and divinylether may be used. Typical inorganic crosslinking agents are polyvalent metals, chelated polyvalent metals, and compounds capable of yielding polyvalent metals, including organometallic compounds as well as borates and boron complexes, and mixtures thereof. Preferred inorganic crosslinking agents include chromium salts, complexes, or chelates, such as chromium nitrate, chromium citrate, chromium acetate, chromium propionate, chromium malonate, chromium lactate, etc.; aluminum salts, such as aluminum citrate, aluminates, and aluminum complexes and chelates; titanium salts, complexes, and chelates; zirconium salts, complexes or chelates, such as zirconium lactate; and boron containing compounds such as boric acid, borates, and boron complexes. Fluids containing additives such as those described in U.S. Pat. No. 4,683,068 and U.S. Pat. No. 5,082,579 may be used.

As mentioned, the pre-gel fluid suspension formed in the invention may be foamed, normally by use of a suitable gas. Foaming procedures are well known, and per se form no part of the invention. In such instances, the fluids of the invention will preferably include a surfactant or surfactants. Preferred surfactants are water-soluble or dispersible and have sufficient foaming ability to enable the composition, when traversed or agitated by a gas, to foam. The selection of a suitable surface active agent or agents, is within the ability of those skilled in the art. Preferred surfactants are those which, when incorporated into water in a concentration of about 5 weight percent or less (based on the total weight of water and surfactant), meet the test described in the aforementioned U.S. Pat. No. 5,246,073.

Similarly, the precise nature of the proppant employed is not critical, the proppant being selected for the desired purpose, i.e., "propping" open a fracture, and those skilled in the art may readily select an appropriate wellbore particulate solid or solids for the desired purpose. The term "proppant" is understood to include mixtures, and may include, for example, a mixture of different sized proppants, or a gravel. Resin coated sand or ceramic proppant may be used. Particles or beads of silica, sintered materials or minerals, such as sintered bauxite, alumina, or corundum, may be used. Generally, the proppant will be added or present in the fluid in a concentration of from 0.5 or 1 lb./gallon to about 25 lbs/gallon, preferably from 1 lb./gallon to about 20 lbs/gallon. Normally, the proppant will have an average particle size less than about 8 mesh and greater than 60 or 80 mesh (U.S.). Sized mixtures of particles may be used, such as the common larger sized natural and synthetic inorganic proppant mixtures. Sized sand and synthetic inorganic proppants such as 20/40 sized sand, 16/20 sized sand, 12/20 sized sand, 8/12 sized sand, and similarly sized ceramic proppants, such as "CARBOLITE™" proppants, may be used.

The novel blend of aqueous suspending fluid, proppant, gellant, crosslinking agent, and organic polymeric particulate matter may be prepared, as indicated, in any suitable manner, the components being blended in any suitable sequence. Normally, however, the preferred job execution practice is to mix the entire batch to be pumped during the job. In some instances, it may be preferred to pump the suspension of the invention only during a portion of the job, e.g., as the last 10–25% of the proppant into the fracture as a "tail-in", to control flow back in the most economical manner or for other reasons. A slug may also be pumped at other stages. As mentioned, the invention has particular advantage in treatment of subterranean formations having a temperature above about 225° F.

In one procedural aspect of the invention, the fluid suspension is pumped down well, normally gelled, through the wellbore under fracturing pressure to the subterranean formation, and the subterranean formation may be fractured or the fracture may be extended. Gelling may be initiated or enhanced, for example, by temperature or by pH control, in a manner known to those skilled in the art. The gelled suspension is deposited in the formation, and after a suitable interval, such as after the fracturing operation is completed, the decomposition or reaction of the particulate matter in the downwell environment becomes significant. If necessary, the interval may be extended as appropriate to allow the gelled suspension to "break" or degrade. As used herein, the term "downwell environment" simply refers to the circumstances acting on the organic polymeric particulate matter downwell, including, but not limited to, the temperature of the subterranean formation, the composition of the formation, and any component or components of the suspension. Upon degradation of the gel by the action of the decomposition or reaction products, the fluids resulting from the breaking of the gel, minus leak-off, are then returned or allowed to return from the deposit locus to the wellbore, the decomposition or reaction of the solid particulate matter in effect "removing" organic polymeric particulate matter from the deposit. If additional particulate matter, such as durable fibers and/or platelets, or other materials are in the suspension deposited in the fracture, a matrix or pack of such and proppant (with a minor residuum of welltreating fluid) is left in the fracture.

The following procedures were conducted.

I.

Five hundred milliliter fluid samples containing standard carboxymethylhydroxypropyl guar were prepared, each having a concentration of the carboxymethylhydroxypropyl guar equivalent to 60 pounds per 1000 gallons, along with conventional fracturing fluid additives. Measured amounts of 1.5 denier Dacron® fibers, average length of one-fourth inch, were added to the solution samples and mixed therewith, and a standard high temperature crosslinking additive was added. Accordingly, therefore, the only difference in the samples was the amount of Dacron® fibers. Viscosity measurements of the samples, along with that of a control sample, were then taken over time, using standard viscosity measurement procedure API 93F, with a Fann 50 viscometer using a B2 bob. FIG. 1 illustrates the results of the measurements, in which:

Line a is a control, no fibers present;
Line b represents measurements with 0.2 wt. percent Dacron® fibers;
Line c represents measurements with 0.4 wt. percent Dacron® fibers;
Line d represents measurements with 0.6 wt. percent Dacron® fibers;
Line e represents measurements with 0.8 wt. percent Dacron® fibers;
Line f represents temperature.

The measurements indicate enhanced breaking ability using Dacron® fibers. In all of the runs, fiber concentrations were substantially diminished at completion, indicating decomposition of the fibers or reaction with the fluid or component(s) thereof.

II.

The above-described procedures were repeated using one-fourth inch, 6.0 denier Dacron® fibers, at a different final temperature. The results are shown in FIG. 2, in which:

Line a is a control, no fibers present;

Line b represents measurements with 0.2 wt. percent Dacron® fibers;

Line c represents measurements with 0.4 wt. percent Dacron® fibers;

Line d represents measurements with 0.6 wt. percent Dacron® fibers;

Line e represents measurements with 0.8 wt. percent Dacron® fibers;

Line f represents measurements with 1.0 wt. percent Dacron® fibers;

Line g represents temperature.

The measurements indicate decomposition of at least a portion of the Dacron fibers in each of the runs.

III.

Fracture conductivity tests of Dacron® fibers-containing fluids were conducted, using a cell of the "Cooke-type", which is analogous to that used in the API-specified method for measuring proppant-only permeability (Cooke, C. E.: SPE 5114 "Effect of Fracturing Fluids on Fracture Conductivity," *J. Pet. Tech.*, (October 1975) 1273–82., API RP 56, "Recommended Practices for Testing Sand Used in Hydraulic Fracturing Operations," First Edition, March 1983, © American Petroleum Institute 1983). In a modification of the standard procedure, 20/40 bauxite was used as proppant and closure stresses of 10,000 psi were employed. The results are shown in the following table.

TABLE

A.

| Fluid | % Retained Permeability* |
| --- | --- |
| Zr crosslinked guar, 60 lbs/1000 gal. | 8 |
| Zr crosslinked guar, 60 lbs/1000 gal. + 1 wt % 1.5 denier Dacron ® fibers | 29 |

*After 26 hours at 375° F., 10000 psi closure stress, 20/40 bauxite.

B.

| Fluid | % Retained Permeability* |
| --- | --- |
| uncrosslinked guar, 30 lbs/1000 gal. 2% KCl + 1.5 denier Dacron ® fibers | 85 (4 hours) 55 (5 hours) |
| uncrosslinked guar, 30 lbs/1000 gal. + 1 wt % 1.5 denier Dacron ® fibers | 100 (5 hours) |

TABLE-continued

| | |
| --- | --- |
| uncrosslinked guar, 60 lbs/1000 gal. + 1 wt % 6.0 denier Dacron ® fibers | 75 (9 hours) |

*At 375° F., 10000 psi closure stress, 20/40 bauxite.
The results indicate decomposition of the fibers.

What is claimed is:

1. A method of fracturing a subterranean formation comprising providing a fluid suspension comprising an aqueous liquid, a gellant in an amount sufficient to gel the fluid suspension, proppant, and solid particulate matter comprising an organic polymeric compound having an average molecular weight of at least 10,000, selected from polyester, polyurethane, polymers of acrylic acid, aramides, acrylonitrile, polyamides, vinylidene, olefins, diolefins, vinyl alcohol, and vinyl chloride, or mixture of such polymers, and which compound or compounds react or decompose over time under downwell conditions, in an amount at least sufficient to provide a concentration of a composition or compositions, upon such reaction or decomposition of the particulate matter, effective to degrade gel formed by the suspension;

pumping the fluid suspension downwell under fracturing conditions and forming or extending a fracture in the subterranean formation, and depositing gelled suspension in the fracture;

allowing gelled suspension in said fracture to break due to degradation by said composition or compositions.

2. The method of claim 1 in which said organic compound or compounds are selected from polymers of acrylic acid, aramides, acrylonitrile, polyamides, vinylidene, olefins, diolefins, polyester, polyurethane, vinyl alcohol, and vinyl chloride, having an average molecular weight of at least 18,000.

3. The method of claim 2 in which the solid particulate material is in the form of fibers and/or platelets.

4. The method of claim 3 in which the solid particulate material is in the form of fibers and the fibers are selected from fibers of polyester and polyamide, and mixtures thereof.

5. The method of claim 4 in which the fibers are selected from polyethylene terephthalate and polyamide fibers, and mixtures thereof.

6. A method of fracturing a subterranean formation comprising pumping a fluid suspension containing a gellant downwell under fracturing conditions to form a fracture in the subterranean formation, and depositing gelled suspension in the fracture, the fluid suspension further comprising an aqueous liquid, proppant, and solid particulate matter comprising an organic polymeric compound having an average molecular weight of at least 10,000, or mixture of such compounds, selected from polyester, polyurethane, polymers of acrylic acid, aramides, acrylonitrile, polyamides, vinylidene, olefins, diolefins, vinyl alcohol, and vinyl chloride, and which compound or compounds react or decompose over time under downwell conditions, in an amount at least sufficient to provide a concentration of a composition or compositions, upon such reaction or decomposition of the solid particulate matter, effective to degrade gel formed by the suspension;

removing solid particulate matter from the fracture by reaction or decomposition of said particulate matter in the fracture, the reaction or decomposition products from such reaction or decomposition reacting with the gellant and decomposing or breaking gelled suspension in the fracture.

7. The method of claim 6 in which said organic compound or compounds are selected from polymers of acrylic acid, aramides, acrylonitrile, polyamides, vinylidene, olefins, diolefins, polyester, polyurethane, vinyl alcohol, and vinyl chloride, having an average molecular weight of at least 18,000.

8. The method of claim 7 in which the solid particulate material is in the form of fibers and/or platelets.

9. The method of claim 8 in which the solid particulate material is in the form of fibers and the fibers are selected from fibers of polyester and polyamide, and mixtures thereof.

10. The method of claim 9 in which the fibers are selected from polyethylene terephthalate and polyamide fibers, and mixtures thereof.

11. The method of claim 6 in which an amount of durable fibers and/or platelets sufficient to maintain a porous pack in place in the fracture with proppant employed is also contained in the fluid suspension.

12. A method of fracturing a subterranean formation comprising providing a fluid suspension formed by blending, in any sequence, an aqueous liquid, a gellant in an amount sufficient to gel the fluid suspension, proppant, and solid particulate matter comprising an organic polymeric compound having an average molecular weight of at least 10,000, or mixture of such compounds, selected from polyester, polyurethane, polymers of acrylic acid, aramides, acrylonitrile, polyamides, vinylidene, olefins, diolefins, vinyl alcohol, and vinyl chloride, and which compound or compounds react or decompose over time in an amount at least sufficient to provide an amount of their reaction or decomposition products, upon such reaction or decomposition of the particulate matter, effective to degrade a gel formed by the fluid suspension in a fracture;

pumping the suspension formed downwell under fracturing conditions and forming or extending a fracture in the subterranean formation, and depositing gelled suspension in the fracture;

allowing gelled suspension in said fracture to break due to degradation by said composition or compositions.

13. The method of claim 12 in which said organic compound or compounds are selected from polymers of acrylic acid, aramides, acrylonitrile, polyamides, vinylidene, olefins, diolefins, polyester, polyurethane, vinyl alcohol, and vinyl chloride, having an average molecular weight of at least 18,000.

14. The method of claim 13 in which the solid particulate material is in the form of fibers and/or platelets.

15. The method of claim 14 in which the solid particulate material is in the form of fibers and the fibers are selected from fibers of polyester and polyamide, and mixtures thereof.

16. The method of claim 15 in which the fibers are selected from polyethylene terephthalate and polyamide fibers, and mixtures thereof.

17. The method of claim 12 in which the reaction or decomposition of said particulate matter in the fracture removes solid particulate matter from the fracture, the reaction or decomposition products from such reaction or decomposition being in a concentration effective to decompose or break the gelled suspension.

18. A method of breaking a gelled suspension in a fracture comprising allowing reaction of the gelled suspension or component thereof with an effective amount of one or more reaction or decomposition products from the reaction or decomposition in the downwell environment of solid particulate matter in the gelled suspension, the particulate matter being selected from reactive or decomposable solid organic polymeric compounds, and mixtures thereof, such compound or compounds having an average molecular weight of at least 10,000 selected from polyester, polyurethane, polymers of acrylic acid, aramides, acrylonitrile, polyamides, vinylidene, olefins, diolefins, vinyl alcohol, and vinyl chloride.

19. The method of claim 17 in which an amount of durable fibers and/or platelets sufficient to maintain a porous pack in place in the fracture with proppant employed is also contained in the fluid suspension.

20. A method of fracturing a subterranean formation comprising pumping a pad fluid downwell under fracturing conditions and forming a fracture in the subterranean formation;

providing a fluid suspension comprising an aqueous liquid, a gellant in an amount sufficient to gel the fluid suspension, proppant, and solid particulate matter comprising an organic polymeric compound having an average molecular weight of at least 10,000, or mixture of such compounds, selected from polyester, polyurethane, polymers of acrylic acid, aramides, acrylonitrile, polyamides, vinylidene, olefins, diolefins, vinyl alcohol, and vinyl chloride, and which compound or compounds react or decompose in the fracture in an amount at least sufficient to provide an amount of a composition or compositions, upon such reaction or decomposition of the particulate matter, effective to degrade a gel formed by the fluid suspension in a fracture;

pumping the suspension formed downwell under fracturing conditions and extending the fracture in the subterranean formation, and depositing gelled suspension in the fracture;

removing solid particulate matter from the fracture by reaction or decomposition of such matter in the fracture, the reaction or decomposition providing a composition or compositions effective to break the gelled suspension.

21. The method of claim 20 in which the pad fluid comprises a fluid suspension comprising an aqueous liquid, a gellant in an amount sufficient to gel the pad fluid, and solid particulate matter comprising an organic polymeric compound having an average molecular weight of at least 10,000, or mixture of such compounds, and which react or decompose in the fracture in an amount at least sufficient to provide an amount of a composition or compositions, upon such reaction or decomposition of the particulate matter, effective to degrade a gel formed by the pad-fluid in a fracture.

22. The method of claim 20 in which an amount of durable fibers, platelets, or mixture thereof, sufficient to maintain a porous pack with proppant employed is also contained in the fluid suspension.

23. The method of claim 20 in which said organic compound or compounds are selected from polymers of acrylic acid, aramides, acrylonitrile, polyamides, vinylidene, olefins, diolefins, polyester, polyurethane, vinyl alcohol, and vinyl chloride, having an average molecular weight of at least 18,000.

24. The method of claim 1 in which the solid particulate matter is selected from a polyester polymer, a polyamide polymer, and mixtures thereof.

25. The method of claim 24 in which the solid particulate material is in the form of fibers and/or platelets.

26. The method of claim 12 in which the solid particulate matter is selected from polyester polymer, a polyamide polymer, and mixtures thereof.

27. The method of claim 26 in which the solid particulate material is in the form of fibers and/or platelets.

28. The method of claim 1 in which the reaction or decomposition of said particulate matter in the fracture removes solid particulate matter from the fracture, the reaction or decomposition products from such reaction or decomposition being in a concentration effective to decompose or break the gelled suspension.

29. The method of claim 12 in which an amount of durable fibers and/or platelets sufficient to maintain a porous pack in place in the fracture with proppant employed is also contained in the fluid suspension.

* * * * *